Sept. 1, 1936.  A. J. OTTO  2,053,042
AIR CONDITIONING
Filed May 17, 1935
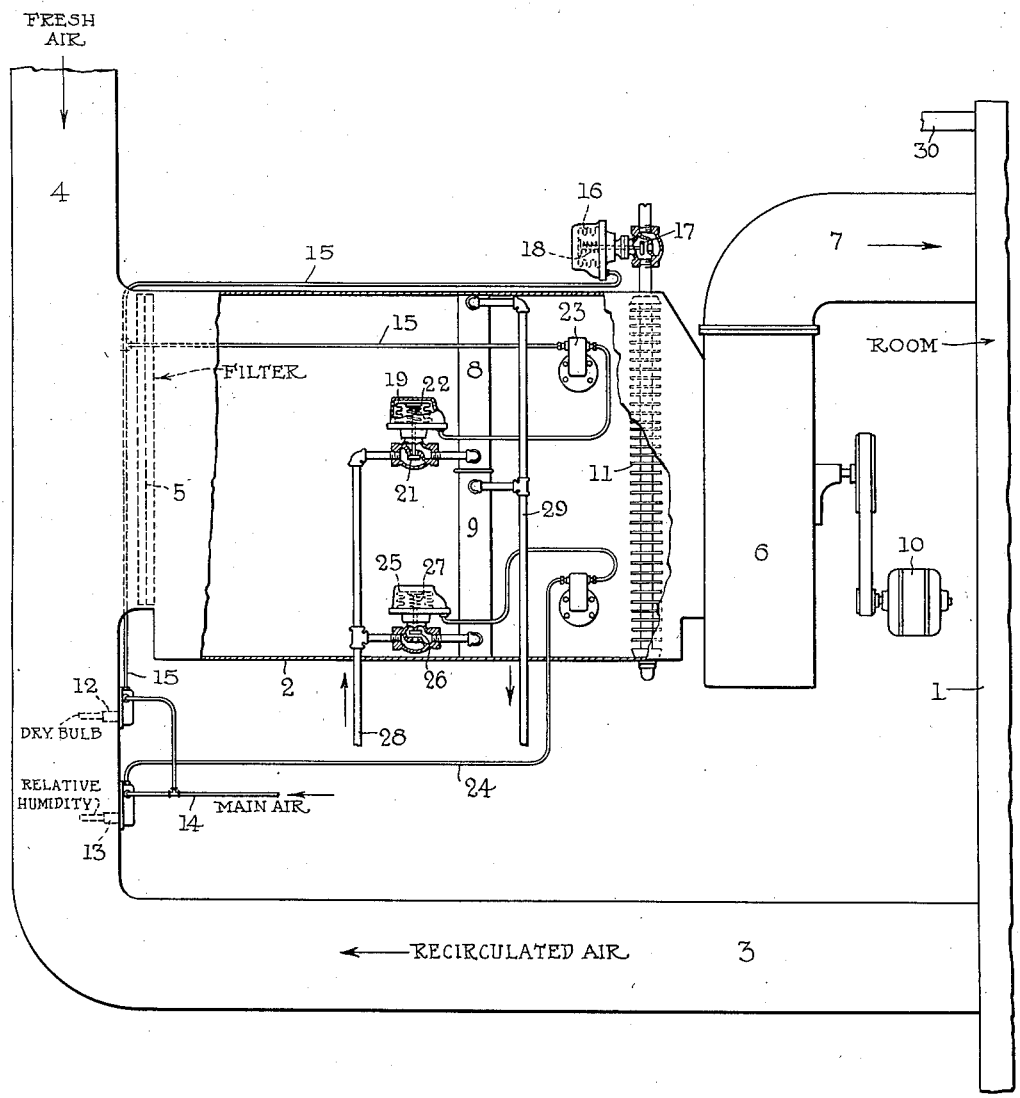
Inventor
Arthur J. Otto
By
Attorneys Patented Sept. 1, 1936

2,053,042

UNITED STATES PATENT OFFICE 2,053,042

AIR CONDITIONING

Arthur J. Otto, Milwaukee, Wis., assignor to Johnson Service Company, Milwaukee, Wis., a corporation of Wisconsin Application May 17, 1935, Serial No. 22,057

2 Claims. (Cl. 257—9)

This invention relates to conditioning air as to temperature and humidity to establish comfort conditions in rooms, auditoriums, stores and other enclosures in which people assemble.

The invention contemplates the delivery to the enclosure, preferably in mixed condition of two streams of air, one of which is conditioned as to dry bulb temperature prior to mixing with the other, and the other of which is conditioned as to relative humidity prior to such mixing. The conditioning of the first stream is controlled by a thermostat subject to dry bulb temperature in the enclosure, while the conditioning of the second stream is controlled by a humidistat subject to relative humidity of air in the enclosure.

The source of air to be conditioned may be determined by local conditions, but ordinarily a major portion would be air drawn from the enclosure (recirculated air) and a minor portion air drawn from out-of-doors ("fresh" air). Where this is done the thermostat and humidistat may conveniently be located in the recirculated air duct, such location being equivalent to location in the enclosure.

The first stream is conditioned by heating or cooling the air by passage over a surface cooler and a surface heater which are selectively operated, the cooler being operated always (or substantially always) above the dewpoint of the entering air.

The second stream is conditioned by passing it over a surface cooler which when dehumidification is desired is operated at a temperature below the dewpoint of the entering air.

The first-named cooler and the heater are controlled by the thermostat and the second-named cooler is controlled by the humidistat. Air passing the second cooler may, and preferably does, pass over the heater. In effect the thermostat and humidistat control the temperatures of the heater and the coolers which they regulate.

Steam or hot water are convenient heating media. Refrigerated water is a convenient cooling medium, but direct expansion coolers may be used where means to control the suction pressure in each cooler (and consequently its temperature) can be conveniently provided.

An embodiment of the invention using steam and refrigerated water will now be described in connection with the accompanying drawing, in which the single figure is a diagrammatic section of a portion of an enclosure and a conditioner embodying the invention connected therewith.

A portion of the enclosure is indicated at 1, the conditioner casing is indicated at 2, the recirculation duct at 3 and the fresh air duct at 4. The ducts 3 and 4 lead to the entrance end of casing 2 and supply air to the conditioner through a filter conventionally indicated at 5.

A circulating fan 6 (sometimes called a total volume fan) draws air from casing 2 and delivers it through duct 7 to the enclosure 1. Fan 6 is driven by motor 10. The general arrangement so far indicated is conventional.

Arranged transversely to the path of air flow through casing 2, and conjointly extending across the entire cross section of the interior of the casing, are two air cooling heat exchangers 8 and 9. The air cooling exchanger 8 is intended for reducing the temperature of the air without dehumidification and hence is normally operated at a temperature above the dewpoint. The air cooling exchanger 9 is for dehumidifying and hence is operated at least at times at temperatures below the dewpoint of the air. These exchangers are conventionally indicated and may, for example, be of the radiator or finned tube types. The temperatures of the cooling exchangers are regulated, in the embodiment illustrated, by regulating the flow rates of refrigerated water through them. Since the cooled water is a heat convector, control of the rate of supply of water to the exchanger will vary the temperature of the exchanger so that the two exchangers 8 and 9 may be operated at different temperatures although they have a common supply.

At a point in the path of air flow through casing 2 beyond exchangers 8 and 9 is an air heating exchanger 11 illustrated as a finned steam radiator. This is shown as extending across the entire cross section of casing 2 so that it affects air from both coolers 8 and 9. It is not essential that it extend into the path of air leaving the dehumidifying cooler 9. Thus the coil 11 can be arranged so that it extends only part way across the housing and is in the path of air flowing through the cooler 8. Cooler 8 and coil 11 are effective alternatively as will be explained.

Inserted in duct 3 are an insertion type dry bulb thermostat 12 and an insertion type relative humidity humidistat 13 each of the pneumatic type. These are fed with compressed air from any suitable source through line 14.

Thermostat 12 acts in response to rising temperature, in a narrow range approximating the desired temperature, to establish in its branch line 15, a pressure which increases from atmospheric pressure, to say 15 pounds gage. Branch line 15 is connected to bellows motor 16, and on rising pressure motor 16 progressively closes the normally open valve 17 against the resistance of spring 18. Spring 18 is of such strength that closure occurs when branch line pressure is say 4 pounds gage, terminating the supply of heating medium to heater 11. Branch line 15 is also connected to bellows motor 19 which, on rising pressure, progressively opens normally closed valve 21 against the resistance of spring 22. The spring 22 is of such strength that valve 21 starts to open and supply cooling medium to cooler 8 when branch line pressure reaches say 8 pounds gage. Thus on rising temperature the thermostat gradually shuts down the heater 11 and then after a further rise gradually turns on the cooler 8.

As an optional feature, a low limit thermostat 23 is interposed in the branch line 15 and is subject to the temperature of air leaving cooler 8. Its function is to take control if the temperature of such air reaches a chosen low range (say 65°–70°) and prevent thermostat 12 from reducing it further.

Humidistat 13 operates in response to falling relative humidity, in a narrow range approximating the desired value, to establish in branch line 24 an increasing pressure varying from atmospheric to say 15 pounds gage. Branch line 24 is connected with bellows motor 25 which acts, under rising pressure, to close normally open valve 26 progressively against the resistance of spring 27. Valve 26 controls the supply of cooling medium to dehumidifying cooler 9.

As an optional feature a high limit thermostat, subject to the temperature of air leaving dehumidifying cooler 9, may be interposed in line 24. Its function is to take control if the temperature of such air reaches a chosen high range (say 70°–75°) and prevent humidistat 13 from increasing it further.

Valves 21 and 26 may control the supply of cooling media from any suitable source, but a single source of cooling water is indicated by pipe 28. A waste pipe is indicated at 29 connected to both coolers. If a mechanical refrigerating system is used 28 would be the supply and 29 the return line of a closed circuit including the refrigerator (not shown).

Water supplied through pipe 28 could be at about 40° F. and the different rates of flow through exchangers 8 and 9 would establish the desired different temperatures.

Where air leakage from the enclosure 1 would approximately equal the fresh air entering duct 4, no special vent from enclosure 1 is necessary. Such a vent may be used and is indicated at 30.

The thermostats and humidistat described are standard articles of commerce, and no novelty is claimed for them. Equivalents may be substituted. All quantitative values suggested are illustrative and not limiting. Various modifications may be made without departing from the broad inventive concept.

What is claimed is—

1. The combination with an enclosure whose air is to be conditioned as to temperature and humidity, of means for propelling two streams of air and delivering them together to said enclosure; a cooler in the path of the first stream; a cooler in the path of the second stream; a heater in the path of both streams beyond said coolers; a thermostat subject to the temperature in the enclosure and connected to control the first cooler and said heater and functioning to put the heater gradually out of action and then bring the first cooler gradually into action in response to rising temperature; a device responsive to relative humidity in said enclosure and connected to control the second cooler to bring said cooler progressively into action upon rising relative humidity; and thermostatic means subject to the temperatures of air leaving the two coolers and serving to impose a low limit on the temperature of the air leaving the first cooler and a high limit on the temperature of the air leaving the second cooler.

2. The combination with an enclosure whose air is to be conditioned as to temperature and humidity, of means for propelling two streams of air and delivering them together to said enclosure; a cooler in the path of the first stream; a cooler in the path of the second stream; a heater in the path of the first stream beyond the first-named cooler; a thermostat subject to the temperature in the enclosure and connected to control the first cooler and said heater and functioning to put the heater gradually out of action and then bring the first cooler gradually into action in response to rising temperature; a device responsive to relative humidity in said enclosure and connected to control the second cooler to bring said cooler progressively into action upon rising relative humidity; and thermostatic means subject to the temperatures of air leaving the two coolers and serving to impose a low limit on the temperature of the air leaving the first cooler and a high limit on the temperature of the air leaving the second cooler.

ARTHUR J. OTTO.